United States Patent
Lema et al.

(10) Patent No.: US 9,720,413 B1
(45) Date of Patent: Aug. 1, 2017

(54) SYSTEMS AND METHODS FOR PROVIDING FLIGHT CONTROL FOR AN UNMANNED AERIAL VEHICLE BASED ON OPPOSING FIELDS OF VIEW WITH OVERLAP

(71) Applicant: GOPRO, INC., San Mateo, CA (US)

(72) Inventors: Pablo Lema, San Mateo, CA (US); Gary Fong, San Mateo, CA (US); Shu Ching Ip, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/977,522

(22) Filed: Dec. 21, 2015

(51) Int. Cl.
| | |
|---|---|
| *G05D 3/00* | (2006.01) |
| *G06F 7/00* | (2006.01) |
| *G05D 1/00* | (2006.01) |
| *B64C 13/18* | (2006.01) |
| *G05D 1/10* | (2006.01) |

(52) U.S. Cl.
CPC ........... *G05D 1/0088* (2013.01); *B64C 13/18* (2013.01); *G05D 1/102* (2013.01)

(58) Field of Classification Search
None
See application file for complete search history.

(56) References Cited

U.S. PATENT DOCUMENTS

| | | | |
|---|---|---|---|
| 3,180,205 A | 4/1965 | Heppe | |
| 6,141,034 A * | 10/2000 | McCutchen | G02B 27/22 348/36 |
| 2002/0180759 A1* | 12/2002 | Park | G06T 3/0012 345/629 |
| 2005/0062869 A1* | 3/2005 | Zimmermann | G02B 13/06 348/335 |
| 2009/0251530 A1* | 10/2009 | Cilia | B60R 11/04 348/39 |
| 2012/0154785 A1* | 6/2012 | Gilliland | G01S 7/4813 356/5.01 |
| 2013/0166103 A1* | 6/2013 | Ko | H04N 7/18 701/2 |
| 2014/0036064 A1* | 2/2014 | Lu | B60Q 9/005 348/118 |
| 2014/0132804 A1* | 5/2014 | Guissin | G02B 13/06 348/239 |
| 2014/0192144 A1* | 7/2014 | St. Clair | H04N 5/2251 348/36 |

(Continued)

*Primary Examiner* — Nicholas Kiswanto
*Assistant Examiner* — Kenny A Taveras
(74) *Attorney, Agent, or Firm* — Sheppard Mullin Richter & Hampton LLP (57) ABSTRACT

This disclosure relates to providing flight control for an unmanned aerial vehicle based on opposing fields of view with overlap. The UAV may include a housing, a motor, a first image sensor, a second image sensor, a first optical element having a first field of view greater than 180 degrees, a second optical element having a second field of view greater than 180 degrees, and one or more processors. The first optical element and the second optical element may be carried by the housing such that a centerline of the second field of view is substantially opposite from a centerline of the first field of view, and a peripheral portion of the first field of view and a peripheral portion of the second field of view overlap. Flight control for the UAV may be provided based on parallax disparity of an object within the overlapping fields of view.

20 Claims, 3 Drawing Sheets

(56) References Cited

U.S. PATENT DOCUMENTS

| | | | |
|---|---|---|---|
| 2014/0240464 A1* | 8/2014 | Lee | G01S 17/08 348/47 |
| 2014/0267596 A1* | 9/2014 | Geerds | H04N 5/2252 348/38 |
| 2014/0362176 A1* | 12/2014 | St. Clair | H04N 5/23238 348/36 |
| 2015/0071524 A1* | 3/2015 | Lee | G06T 7/0075 382/154 |
| 2015/0160658 A1 | 6/2015 | Reedman | |
| 2016/0037068 A1* | 2/2016 | Jenny | G11B 27/031 348/36 |
| 2016/0105609 A1* | 4/2016 | Pettegrew | G06T 7/80 348/37 |
| 2016/0259330 A1* | 9/2016 | Lacaze | G05D 1/0016 |
| 2016/0274338 A1* | 9/2016 | Davies | G03B 17/12 |
| 2016/0286119 A1* | 9/2016 | Rondinelli | G03B 17/12 |
| 2016/0327950 A1* | 11/2016 | Bachrach | G05D 1/0016 |
| 2016/0349599 A1* | 12/2016 | Macmillan | G03B 37/04 |
| 2016/0360104 A1* | 12/2016 | Zhang | G06T 3/0062 |
| 2016/0376004 A1* | 12/2016 | Claridge | B64C 19/00 701/3 |
| 2017/0006340 A1* | 1/2017 | Enke | H04N 21/44028 |

* cited by examiner

SYSTEMS AND METHODS FOR PROVIDING FLIGHT CONTROL FOR AN UNMANNED AERIAL VEHICLE BASED ON OPPOSING FIELDS OF VIEW WITH OVERLAP

FIELD

This disclosure relates to systems and methods for providing flight control for an unmanned aerial vehicle based on overlapping fields of view.

BACKGROUND

It is known that unmanned aerial vehicles, or UAVs, may be equipped with a pair of optical elements that guide light to image sensors, and that images of an object captured by the image sensors may be used to determine parallax disparity of the object. In such UAVs, the optical elements are arranged side by side, like human eyes, and are directed towards the same view.

SUMMARY

The disclosure relates to providing flight control for an unmanned aerial vehicle based on opposing fields of view with overlap. Overlap between opposing fields of view may be created by a first optical element, having a first field of view greater than 180 degrees, and a second optical element, having a second field of view greater than 180 degrees, carried by a housing of the UAV such that a centerline of the second field of view is substantially opposite from a centerline of the first field of view, and such that a peripheral portion of the first field of view and a peripheral portion of the second field of view overlap. Parallax disparity of an object within the overlapping fields of view may be determined and flight control for the UAV may be provided based on the parallax disparity.

A UAV may include one or more of an housing, a motor, a first image sensor, a second image sensor, a first optical element, a second optical element, one or more processors, and/or other components. The motor may be carried by the housing and may be configured to drive a rotor. The rotor may provide thrust to move the UAV in any direction.

The first image sensor may be carried within the housing and may be configured to generate a first output signal conveying first visual information based on light that becomes incident thereon. The second image sensor may be carried within the housing and may be configured to generate a second output signal conveying second visual information based on light that becomes incident thereon. The visual information may include, by way of non-limiting example, one or more of an image, a video, and/or other visual information.

In some implementations, the first image sensor may include one or more of a charge-coupled device sensor, an active pixel sensor, a complementary metal-oxide semiconductor sensor, an N-type metal-oxide-semiconductor sensor, and/or other image sensors. In some implementations, the second image sensor may include one or more of a charge-coupled device sensor, an active pixel sensor, a complementary metal-oxide semiconductor sensor, an N-type metal-oxide-semiconductor sensor, and/or other image sensors.

The first optical element may be configured to guide light within a first field of view to the first image sensor. The first field of view may be greater than 180 degrees, and the first optical element may be carried by the housing. In some implementations, the first optical element may be carried by the housing such that a centerline of the first field of view is substantially parallel to the vertical axis of the UAV.

The second optical element may be configured to guide light within a second field of view to the second image sensor. The second field of view may be greater than 180 degrees. The second optical element may be carried by the housing such that a centerline of the second field of view is substantially opposite from a centerline of the first field of view, and such that a peripheral portion of the first field of view and a peripheral portion of the second field of view overlap. In some implementations, the peripheral portion of the first field of view and the peripheral portion of the second field of view that overlap may circumscribe the UAV around the vertical axis of the UAV.

In some implementations, the first optical element may include one or more of a standard lens, a wide-angle lens, an ultra-wide-angle lens, fisheye lens, and/or other optical elements. In some implementations, the second optical element may include one or more of a standard lens, a wide-angle lens, an ultra-wide-angle lens, fisheye lens, and/or other optical elements.

The one or more processors may be carried by the housing. The one or more processor may be configured by machine readable instructions to receive the first output signal and the second output signal. The one or more processor may be configured by machine readable instructions to determine a disparity of an object within the peripheral portion of the first field of view and the peripheral portion of the second field of view that overlap.

The one or more processor may be configured by machine readable instructions to provide flight control for the UAV based on the disparity. In some implementations, providing flight control for the UAV based on the disparity may include operating the UAV to maintain a minimum distance between the object and/or a maximum distance from the object. In some implementations, providing flight control for the UAV based on the disparity may include operating the UAV to maintain a set distance from the object. In some implementations, providing flight control for the UAV based on the disparity may include operating the UAV to maintain a minimum speed and/or a maximum speed. In some implementations, providing flight control for the UAV based on the disparity may include operating the UAV to maintain a set speed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

An unmanned aerial vehicle may be referred to as UAV. The term "unmanned" refers to the capability of the aerial vehicle to operate without requiring a human operator during a flight. In other words, at least some portion of the flight control may be provided remotely and/or by an autopilot. In some implementations, a UAV may carry passengers, cargo, sensors, and/or other physical objects. In some implementations, a UAV may operate autonomously. Alternatively, and/or simultaneously, in some implementations, at least some functionality of a UAV may be controlled and/or modified through remote control, e.g. by a person, for at least some portion of a flight. For example, a human may control and/or assist remotely in a particular maneuver, such as a take-off or landing.

A UAV may be a fixed wing aircraft, a helicopter, a multi-rotor aircraft (e.g. a quadcopter), a rotary wing aircraft, and/or another type of aircraft. In some implementations, a UAV may combine features of multiple types of aircraft. A UAV may include one or more components configured to provide thrust. By way of non-limiting example, the one or more components providing thrust may include one or more wings, airfoils, motors, propellers, rotors, rotor discs, and/or other components.

Figure 1A:
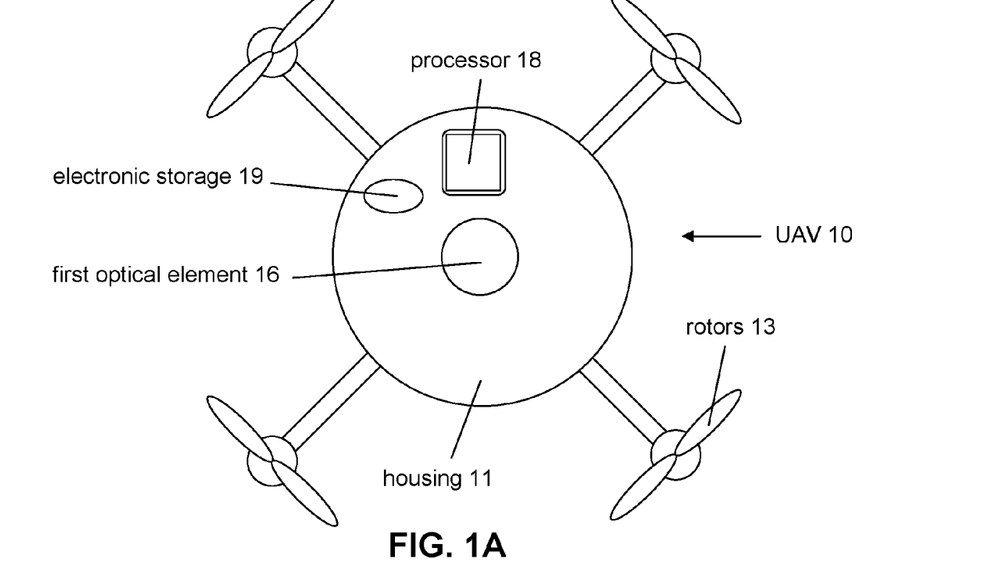
FIG. 1A schematically illustrates a top-down view of an unmanned aerial vehicle in accordance with one or more implementations.
Figure 1B:
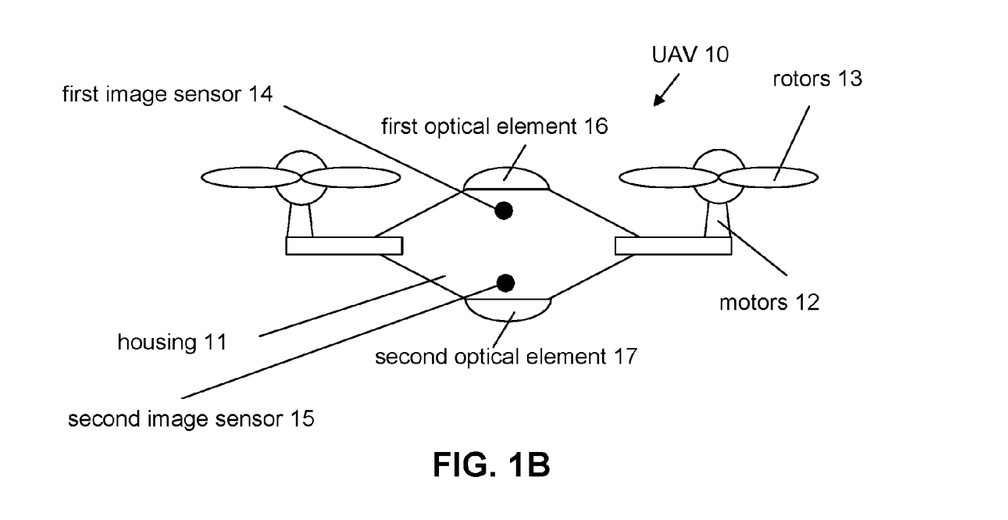
FIG. 1B schematically illustrates a side view of an unmanned aerial vehicle in accordance with one or more implementations.

FIGS. 1A and 1B schematically illustrate an unmanned aerial vehicle 10 (also referred to as UAV 10), in particular a quadcopter. The quadcopter is an exemplary and non-limiting implementation of UAV 10. As illustrated in FIGS. 1A and 1B, UAV 10 may include four motors 12 and four rotors 13. The number of motors and rotors of UAV 10 is not intended to be limited by any depiction. In some implementations, UAV 10 may include one, two, three, four, five, six, and/or more than six motors and/or rotors.

UAV 10 may include one or more of housing 11, motor 12, rotor 13, first image sensor 14, second image sensor 15, first optical element 16, second optical element 17, processor 18, electronic storage 19, and/or other components. First optical element 16 may have a first field of view great than 180 degrees, and second optical element 17 may have a second field of view greater than 180 degrees. The first field of view and the second field of view may overlap. First image sensor 14 may generate a first output signal conveying first visual information based on light guided to first image sensor 14 by first optical element 16, and second image sensor 15 may generate a second output signal conveying second visual information based on light guided to second image sensor 14 by second optical element 17. Processor 18 may receive the first output signal and the second output signal and determine a disparity of an object within the overlapping portions of the first field of view and the second field of view. Processor 18 may provide flight control for UAV 10 based on the disparity.

Housing 11 may be configured to attach to, support, hold, and/or carry components of UAV 10. The combination of housing 11 and components attached to, supported, held, and/or carried by housing 11 may be referred to as an unmanned aerial vehicle.

Rotor 13 may be driven by motor 12. In some implementations, rotor 13 may include a rotor blade, a hub, and a mast. The rotor blade may be connected to the hub, the hub may be connected to the mast, and the mast may be connected to motor 12. In some implementations, rotor 13 may include a rotor blade and a hub. The rotor blade may be connected to the hub, and the hub may be connected to motor 12.

Rotors 13 may provide thrust to move UAV 10 along any direction. In a three-dimensional Cartesian coordinate system, rotors 13 may provide thrust to move UAV 10 along the positive X-axis, the negative X-axis, the positive Y-axis, the negative Y-axis, the positive Z-axis, the negative Z-axis, and any combination thereof. Rotors 13 may provide thrust to rotate UAV 10 along pitch axis, roll axis, yaw axis, and any combination thereof. Rotors 13 may provide thrust to rotate and move UAV 10 at the same time.

First image sensor 14 may be carried within housing 11 and may be configured to generate a first output signal conveying first visual information based on light that becomes incident thereon. In some implementations, the first image sensor may include one or more of a charge-coupled device sensor, an active pixel sensor, a complementary metal-oxide semiconductor sensor, an N-type metal-oxide-semiconductor sensor, and/or other image sensors.

Second image sensor 15 may be carried within housing 11 and may be configured to generate a second output signal conveying second visual information based on light that becomes incident thereon. In some implementations, the second image sensor may include one or more of a charge-coupled device sensor, an active pixel sensor, a complementary metal-oxide semiconductor sensor, an N-type metal-oxide-semiconductor sensor, and/or other image sensors.

The first visual information may include, by way of non-limiting example, one or more of an image, a video, and/or other visual information. The second visual information may include, by way of non-limiting example, one or more of an image, a video, and/or other visual information. One or more of the first visual information and/or the second visual information may be marked, timestamped, annotated, stored, and/or otherwise processed.

First optical element 16 may be configured to guide light within a first field of view to first image sensor 14. While an object is within the first field of view of first optical element 16, first visual information generated by first image sensor 14 includes the object. The first field of view may be greater than 180 degrees.

First optical element may be carried by housing 11. In some implementations, first optical element may 16 be carried by housing 11 such that a centerline of the first field of view is substantially parallel to the vertical axis of UAV 10.

Figure 2:
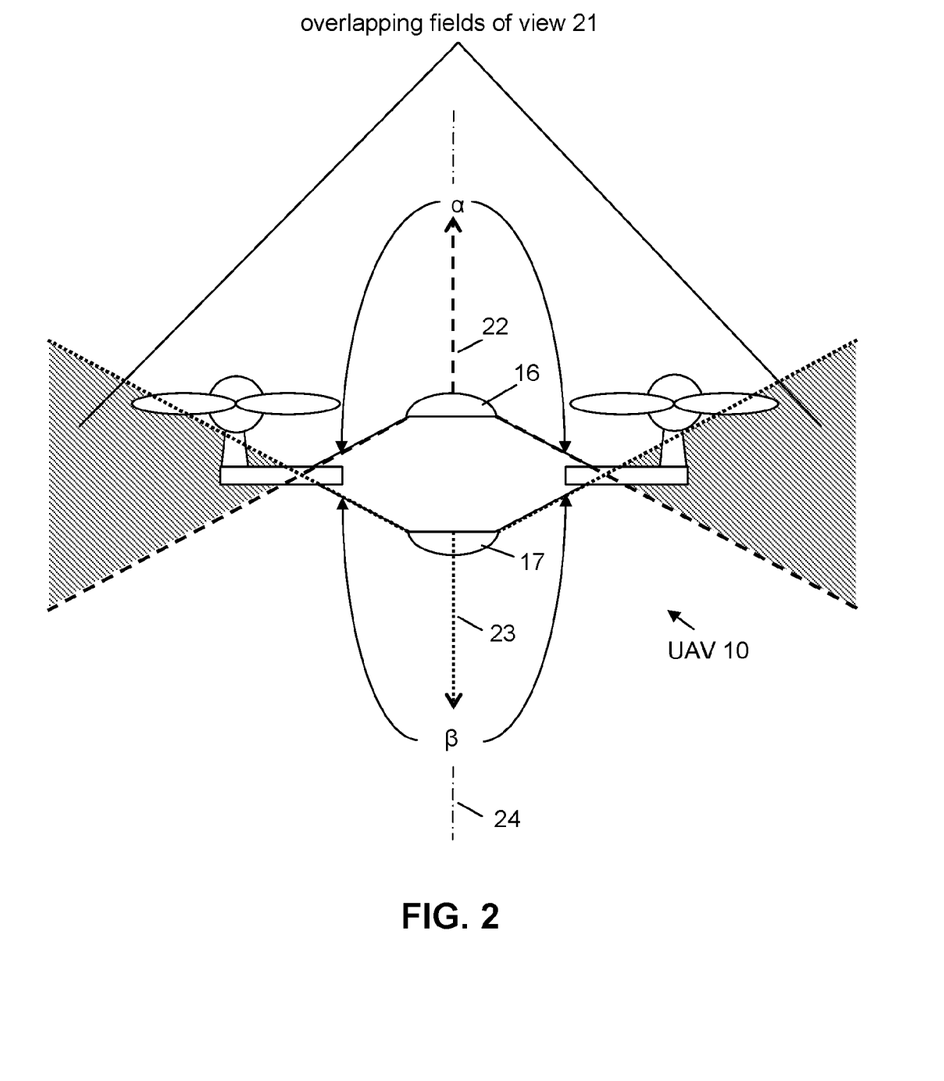
FIG. 2 schematically illustrates a side view of an unmanned aerial vehicle with opposing fields of view with overlap in accordance with one or more implementations.

For example, FIG. 2 schematically illustrates a side view of UAV 10 with opposing fields of view with overlap in accordance with one or more implementations. The centerline of the first field of view 22 is shown as a dashed line. The vertical axis 24 of UAV 10 is shown as a dot-dashed line. In FIG. 2, the centerline of the first field of view 22 coincides with the vertical axis 24 of UAV 10, i.e., the centerline of the first field of view 22 and the vertical axis 24 of UAV 10 lie on top of one another. Because the two lines are coincident, they are also parallel.

Exemplary arrangement of first optical element 16 shown in FIGS. 1A, 1B, and 2 is not intended to be limiting. For example, while first optical element 16 is shown in FIG. 1A to be located at the center of top-down view of UAV 10, first optical element 16 may be located in other locations of UAV 10, offset from the center of top-down view of UAV 10. In some implementations where first optical element 16 is located offset from the center of top-down view of UAV 10, the centerline of the first field of view of first optical element 16 and the vertical axis of UAV 10 may not be coincident.

As another example, while the centerline of the first field of view 22 and the vertical axis 24 of UAV 10 are shown in FIG. 2 to be parallel, the two lines may be offset from each other by certain degrees and still be substantially parallel to each other. In some implementations, the two lines may be substantially parallel when the centerline of the first field of view 22 is offset from the vertical axis 24 of UAV 10 by two degrees or less. In some implementations, the two lines may be substantially parallel when the centerline of the first field of view 22 is offset from the vertical axis 24 of UAV 10 by four degrees or less. In some implementations, the two lines may be substantially parallel when the centerline of the first field of view 22 is offset from the vertical axis 24 of UAV 10 by six degrees or less. In some implementations, the two lines may be substantially parallel when the centerline of the first field of view 22 is offset from the vertical axis 24 of UAV 10 by eight degrees or less. In some implementations, the two lines may be substantially parallel when the centerline of the first field of view 22 is offset from the vertical axis 24 of UAV 10 by ten degrees or less.

In some implementations, the two lines may be substantially parallel when the centerline of the first field of view 22 is offset from the vertical axis 24 of UAV 10 by degrees less than or equal to the degree of tilt of UAV 10 when UAV 10 is moving. For example, UAV 10 may tilt forward by twelve degrees when UAV 10 is moving forward. In some implementations, the two lines may be substantially parallel when the centerline of the first field of view 22 is offset from the vertical axis 24 of UAV 10 by twelve degrees or less.

In some implementations, the offset of the centerline of the first field of view 22 from the vertical axis 24 of UAV 10 may change during operation of UAV 10. For example, the offset of the centerline of the first field of view 22 from the vertical axis 24 of UAV 10 may change based on the degree of tilt of UAV 10. In some implementations, the offset may change to be less than or equal to the degree of tilt of UAV 10.

Second optical element 17 may be configured to guide light within a second field of view to second image sensor 15. While an object is within the second field of view of second optical element 17, second visual information generated by second image sensor 15 includes the object. The second field of view may be greater than 180 degrees.

Second optical element 17 may be carried by housing 11 such that a centerline of the second field of view is substantially opposite from a centerline of the first field of view. In FIG. 2, the centerline of the second field of view 23 is shown as a dotted line. The centerline of the second field of view 23 is directly opposite from the centerline of the first field of view 22, i.e., the centerline of the second field of view 23 is 180 degrees from the centerline of the first field of view 22.

While FIG. 2 shows the centerline of the second field of view 23 to be directly opposite from the centerline of the first field of view 22, this is not intended to be limiting. In some implementations, first optical element 16 may be located at the center of top-down view of UAV 10 while second optical element 17 may not be located at the center of top-down view of UAV 10. The centerline of the first field of view 22 and the vertical axis 24 of UAV 10 may be coincident, while the centerline of the second field of view 23 may be laterally offset from the centerline of the first field of view 22. Other arrangements of first optical element 16 and second optical element 17 are contemplated.

In some implementations, the centerline of the second field of view 23 may be offset by certain degrees from the opposite of the centerline of the first field of view 22, and the centerline of the second field of view 23 and the centerline of the first field of view 22 may still be substantially opposite from each other. In some implementations, the two lines may be substantially opposite from each other when the centerline of the second field of view 23 is offset from the opposite of the centerline of the first field of view 22 by two degrees or less. In some implementations, the two lines may be substantially opposite from each other when the centerline of the second field of view 23 is offset from the opposite of the centerline of the first field of view 22 by four degrees or less. In some implementations, the two lines may be substantially opposite from each other when the centerline of the second field of view 23 is offset from the opposite of the centerline of the first field of view 22 by six degrees or less. In some implementations, the two lines may be substantially opposite from each other when the centerline of the second field of view 23 is offset from the opposite of the centerline of the first field of view 22 by eight degrees or less. In some implementations, the two lines may be substantially opposite from each other when the centerline of the second field of view 23 is offset from the opposite of the centerline of the first field of view 22 by ten degrees or less.

Second optical element 17 may be carried by housing 11 such that a peripheral portion of the first field of view and a peripheral portion of the second field of view overlap. In FIG. 2, the angle of the first field of view is shown as angle alpha ($\alpha$), and the angle of the second field of view is shown as angle beta ($\beta$). Angle $\alpha$ may be greater than 180 degrees. Angel $\beta$ may be greater than 180 degrees. In some implementations, angle $\alpha$ may be equal to angel $\beta$. In some implementations, angle $\alpha$ may be greater than angel $\beta$. In some implementations, angle $\alpha$ may be less than angel $\beta$.

In some implementations, angle $\alpha$ may be 190 degrees. In some implementations, angle $\alpha$ may be greater than 185 degrees. In some implementations, angle $\alpha$ may be greater than 190 degrees. In some implementations, angle $\beta$ may be 190 degrees. In some implementations, angle $\beta$ may be greater than 185 degrees. In some implementations, angle $\beta$ may be greater than 190 degrees. Other angles for angle $\alpha$ and angle $\beta$ are contemplated.

A peripheral portion of the first field of view and a peripheral portion of the second field of view may overlap. The overlapping portions of the peripheral portion of the first field of view and the peripheral portion of the second field of view is shown in FIG. 2 as overlapping fields of view 21. In some implementations, the angle of overlapping fields of view 21 may be symmetrical. For example, the angle of overlapping field of view 21 may be the same in all lateral directions around UAV 10. As another example, the angle of overlapping field of view 21 above UAV 10 may be equal to the angle of overlapping field of view 21 below UAV 10.

In some implementations, the angle of overlapping fields of view 21 may be asymmetrical. For example, the angle of overlapping field of view 21 in lateral directions around UAV 10 may be different. By way of non-limiting example, the angle of overlapping field of view 21 in front of UAV 10 may be greater than the angle of overlapping field of view 21 behind UAV 10. As another example, the angle of overlapping field of view 21 below UAV 10 may be greater than the angle of overlapping field of view 21 above UAV 10.

In some implementations, the angle of overlapping field of view 21 may change during operation of UAV 10. For example, the angle of overlapping field of view 21 in lateral directions around UAV 10 may change so that the angle of overlapping field of view 21 in the direction of movement of UAV 10 becomes larger. As another example, the angle of overlapping fields of view 21 above and below UAV 10 may change to increase in the direction of movement of UAV 10.

In some implementations, first optical element 16 and second optical element 176 may be carried by housing 11 such that blind spots in the first field of view and the second field of view caused by shape and/or curvature of UAV 10 is minimized.

The above described arrangement of first optical element 16 and second optical element 17 may allow for parallax disparity detection of an object within the overlapping portions of the peripheral portion of the first field of view of first optical element 16 and the peripheral portion of the second field of view of second optical element 17. Distance between the object and UAV 10 may be determined based on the parallax disparity.

Parallax refers to the seeming change in position of an object because of a change in the observer's viewpoint. Parallax disparity is the change in position of an object between two viewpoints. Parallax disparity is inversely proportional to the distance from the viewpoints to the object. Parallax disparity of an object and/or distance between an object and UAV 10 may be determined as described in U.S. patent application Ser. No. 14/949,798, entitled "UNMANNED AERIAL VEHICLE WITH PARALLAX DISPARITY DETECTION OFFSET FROM HORIZONTAL," filed Nov. 23, 2015, the foregoing being incorporated herein by reference in its entirety.

In some implementations, the peripheral portion of the first field of view and the peripheral portion of the second field of view that overlap may circumscribe UAV 10 around the vertical axis of UAV 10. For example, as shown in FIG. 2, the overlapping fields of view 21 is symmetrical about the vertical axis 24 of UAV 10 and circumscribes UAV 10 around the vertical axis 24 of UAV 10. In some implementations, the overlapping fields of view 21 may be asymmetrical about the vertical axis 24 of UAV 10 and circumscribe UAV 10 around the vertical axis 24 of UAV 10. For example, the angle of overlapping fields of view 21, the angle of overlapping fields of view 21 below UAV 10, and/or the angle of overlapping fields of view 21 above UAV 10 may be different in different lateral directions around UAV 10.

In some implementations, the peripheral portion of the first field of view and the peripheral portion of the second field of view that overlap may circumscribe UAV 10 around a line that is offset from the vertical axis 24 of UAV 10. The line that is offset from the vertical axis 24 of UAV 10 may be offset by a lateral direction and/or degrees.

First optical element 16 may guide light received from an object to first image sensor 14 directly or indirectly through use of one or more light manipulating components. Second optical element 17 may guide light received from an object to second image sensor 15 directly or indirectly through use of one or more light manipulating components. By way of non-limiting example, a light manipulating components may include one or more of a mirror, a prism, lenses, and/or other light manipulating components.

In some implementations, first optical element 16 may include one or more of a standard lens, a wide-angle lens, an ultra-wide-angle lens, fisheye lens, and/or other optical elements. In some implementations, second optical element 17 may include one or more of a standard lens, a wide-angle lens, an ultra-wide-angle lens, fisheye lens, and/or other optical elements.

In some implementations, one or more of first image sensor 14, second image sensor 15, first optical element 16, and/or second optical element 17 may be carried directly by housing 11. By way of non-limiting example, one or more of first image sensor 14, second image sensor 15, first optical element 16, and/or second optical element 17 may be in physical contact with housing 11 and may be directly attached to housing 11, directly supported by housing 11, directly held by housing 11, and/or otherwise directly carried by housing 11.

In some implementations, one or more of first image sensor 14, second image sensor 15, first optical element 16, and/or second optical element 17 may be carried indirectly by housing 11. By way of non-limiting example, one or more of first image sensor 14, second image sensor 15, first optical element 16, and/or second optical element 17 may not be in physical contact with housing 11 and may be indirectly attached to housing 11, indirectly supported by housing 11, indirectly held by housing 11, and/or otherwise indirectly carried by housing 11. For example, one or more of first image sensor 14, second image sensor 15, first optical element 16, and/or second optical element 17 may be located in a container, and the container may be directly carried by housing 11.

Electronic storage 19 may include electronic storage media that electronically stores information. Electronic storage 19 may store software algorithms, information determined by processor 18, information received remotely, and/or other information that enables UAV 10 to function properly. For example, electronic storage 19 may store visual information (as discussed elsewhere herein), and/or other information.

Processor 18 may be configured to provide information processing capabilities in UAV 10. Processor 18 may include one or more of a digital processor, an analog processor, a digital circuit designed to process information, a central processing unit, a graphics processing unit, a microcontroller, an analog circuit designed to process information, a state machine, and/or other mechanisms for electronically processing information. By way of non-limiting example, a microcontroller may be one or more of 8051, PIC, AVR, and ARM microcontroller. In some implementations, processor 18 may include a plurality of processing units. In some implementations, processor 18 may be coupled with one or more of RAM, ROM, input/output ports, and/or other peripherals.

Processor 18 may be coupled, directly or indirectly, to one or more flight control components. By way of non-limiting example, a flight control component may include one or more of an actuator, a motor, a rotor, an accelerometer, a rate of rotation sensor (e.g., a gyroscope), an inertial measurement unit, a compass, a magnetometer, a pressure sensor, a barometer, a global positioning system device, a distance sensor, an image sensor, an optical element, an electronic storage, and/or other flight control components.

Processor 18 may be configured by a computer-readable instruction to provide information-processing capability. Information-processing capability may include, but is not limited to, receiving a first output signal generated by first image sensor 14, receiving a second output signal generated by second image sensor 15, comparing first visual information conveyed within the first output signal with second visual information conveyed within the second output signal to determine parallax disparity of an object, and/or determining distance between the object and UAV 10 based on the parallax disparity. The object may be located within overlapping portions of a peripheral portion of a first field of view of first optical element 16 and a peripheral portion of a second field of view of second optical element 17. Comparing the first visual information with the second visual information to determine parallax disparity of the object may include one or more of distortion removal, image rectification, disparity map generation, and/or height map generation.

Parallax disparity of an object and/or distance between an object and UAV 10 may be determined as described in U.S. patent application Ser. No. 14/949,798, entitled "UNMANNED AERIAL VEHICLE WITH PARALLAX DISPARITY DETECTION OFFSET FROM HORIZONTAL," filed Nov. 23, 2015, incorporated supra.

Information processing capability of processor 18 may include providing flight control for UAV 10 based on the disparity. By way of non-limiting example, flight control may include one or more of stabilization control, navigation control, altitude control, attitude control, position control, propulsion control, engine control, and/or other control needed and/or used during operation of unmanned aerial vehicles.

In some implementations, providing flight control for UAV 10 based on the disparity may include operating UAV 10 to maintain a minimum distance between the object and/or a maximum distance from the object. A minimum distance may refer to one or both of horizontal distance and/or vertical distance that UAV 10 must keep between UAV 10 and the object. For example, providing flight control for UAV 10 based on the disparity may include operating UAV 10 to avoid the object by maintaining a certain horizontal distance and/or a certain vertical distance from the object. A maximum distance may refer to one or both of horizontal distance and/or vertical distance from the object within which UAV 10 must stay. For example, providing flight control for UAV 10 based on the disparity may include operating UAV 10 to stay near or follow the object by staying within a certain horizontal distance and/or a certain vertical distance around the object. In some implementations, providing flight control for UAV 10 based on the disparity may include operating UAV 10 to maintain a set distance from the object. For example, UAV 10 may be operated to maintain a set distance from an object by setting the same distance for the minimum distance and the maximum distance. Other implementations to operate UAV 10 to maintain a set distance from an object are contemplated. In some implementations, operating UAV 10 to maintain a set distance from an object may include operating UAV 10 to maintain a certain position with respect to the object. For example, UAV 10 may be operated to maintain a set distance south of the object. As another example, UAV 10 may be operated to maintain a set distance behind the object.

In some implementations, providing flight control for UAV 10 based on the disparity may include operating UAV 10 to maintain a minimum speed and/or a maximum speed. A minimum speed may refer to one or both of linear speed and/or angular speed that UAV 10 should not drop below. A maximum speed may refer to one or both of linear speed and/or angular speed that UAV 10 should not exceed. In some implementations, providing flight control for UAV 10 based on the disparity may include operating UAV 10 to maintain a set speed in the vicinity of the object. For example, UAV 10 may be operated to maintain a set speed by setting the same speed for the minimum speed and the maximum speed. Other implementations to operate UAV 10 to maintain a set speed are contemplated.

In some implementations, providing flight control for UAV 10 based on the disparity may include effectuating one or more operating behaviors of UAV 10. Operating behavior may refer to one or more motions and/or operations of UAV 10 and/or one or more components of UAV 10. Motion of UAV 10 and/or one or more components of UAV 10 may refer to motion of UAV 10/component(s) at a time, motion of UAV 10/component(s) over a period of time, motion of UAV 10/component(s) at a location, and/or motion of the UAV 10/component(s) over a distance. Operation of UAV 10 and/or one or more components of UAV 10 may refer to operation of UAV 10/component(s) at a time, operation of UAV 10/component(s) over a period of time, operation of UAV 10/component(s) at a location, and/or operation of UAV 10/component(s) over a distance.

In some implementations, computer-readable instructions may be stored in memory of processor 18. In some implementations, the computer-readable instructions may be stored in electronic storage 19. In some implementations, the computer-readable instruction may be received through remote communication, including, but not limited to, radio communication, Bluetooth communication, Wi-Fi communication, cellular communication, infrared communication, and/or other remote communication. In some implementations, processor 18 may use computer-readable instruction from one or more of memory of processor 18, electronic storage 19, and/or remote communication.

In some implementations, computer-readable instructions may include flight control instructions. Processor 18 may include flight control instructions in its memory to provide flight control. In some implementations, flight control instructions may be stored in electronic storage 19. In some implementations, flight control instructions may be received through remote communication, including, but not limited to, radio communication, Bluetooth communication, Wi-Fi communication, cellular communication, infrared communication, and/or other remote communication. By way of non-limiting example, flight control instructions include one or more of moving UAV 10 in any direction, rotating UAV 10 in any direction, flying UAV 10 in a stable manner, tracking people or objects, avoiding collisions, changing or maintaining linear speed of UAV 10, changing or maintaining angular speed of UAV 10, and/or other functions needed and/or used during operation of unmanned aerial vehicles.

In some implementations, flight control instructions may be stored in electronic storage 19. In some implementations, flight control instructions may be received through remote communication, including, but not limited to, radio communication, Bluetooth communication, Wi-Fi communication, cellular communication, infrared communication, and/or other remote communication. In some implementations, processor 18 may use flight control instructions from one or more of memory of processor 18, electronic storage 19, and/or remote communication.

Although all components of UAV 10 are shown to be located in UAV 10 in FIGS. 1A and 1B, some or all of the components may be installed in UAV 10 and/or be otherwise coupled with UAV 10. Any communication medium may be used to facilitate interaction between any components of UAV 10. One or more components of UAV 10 may communicate with each other through hard-wired communication, wireless communication, or both. Other types of communications are contemplated by the present disclosure. By way of non-limiting example, wireless communication may include one or more of radio communication, Bluetooth communication, Wi-Fi communication, cellular communication, infrared communication, or other wireless communication.

Although first image sensor 14 and second image sensor 15 are depicted in FIG. 1B as single elements, this is not intended to be limiting. One or both of first image sensor 14 and/or second image sensor 15 may include one or more image sensors in one or more locations on or in UAV 10. Although first optical element 16 and second optical element 17 are depicted in FIG. 1B as single elements, this is not intended to be limiting. One or both of first optical element 16 and/or second optical element 17 may include multiple actual components or pieces in one or more locations on or in UAV 10.

Although processor 18 is shown in FIG. 1A as a single entity, this is for illustrative purposes only. In some implementations, processor 18 may comprise a plurality of processing units. These processing units may be physically located within the same device, or processor 18 may represent processing functionality of a plurality of devices operating in coordination. Processor 18 may be configured to execute one or more computer-readable instructions by software; hardware; firmware; some combination of software, hardware, and/or firmware; and/or other mechanisms for configuring processing capabilities on processor 18.

Electronic storage 19 may include electronic storage media that electronically stores information. The electronic storage media of electronic storage 19 may be provided integrally (i.e., substantially non-removable) with UAV 10 and/or removable storage that is connectable to UAV 10 via, for example, a port (e.g., a USB port, a Firewire port, etc.) or a drive (e.g., a disk drive, etc.). Electronic storage 19 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 19 may be a separate component within UAV 10, or electronic storage 19 may be provided integrally with one or more other components of UAV 10 (e.g., processor 18). Although electronic storage 19 is shown in FIG. 1A as a single element, this is not intended to be limiting. In some implementations, electronic storage 19 may comprise a plurality of storage units. These storage units may be physically located within the same device, or electronic storage 19 may represent storage functionality of a plurality of devices operating in coordination.

Figure 3:
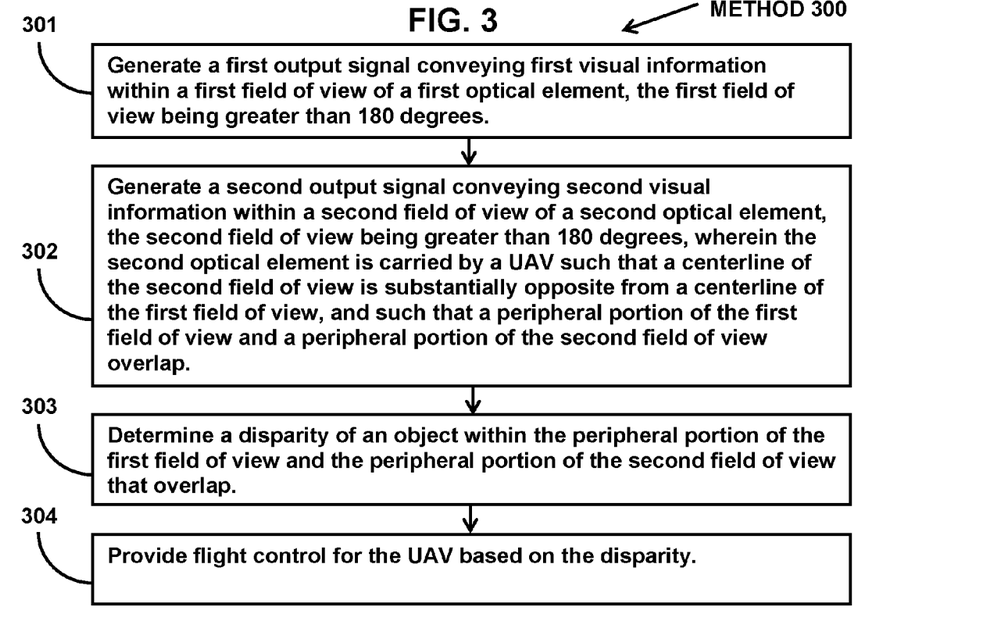
FIG. 3 illustrates a method to provide flight control for an unmanned aerial vehicle based on opposing fields of view with overlap.

FIG. 3 illustrates method 300 for providing flight control for an unmanned aerial vehicle based on opposing fields of view with overlap. The operations of method 300 presented below are intended to be illustrative. In some implementations, method 300 may be accomplished with one or more additional operations not described, and/or without one or more of the operations discussed. In some implementations, two or more of the operations may occur substantially simultaneously.

In some implementations, method 300 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 300 in response to instructions stored electronically on one or more electronic storage mediums. The one or more processing devices may include one or more devices configured through hardware, firmware, and/or software to be specifically designed for execution of one or more of the operations of method 300.

Referring to FIG. 3 and method 300, at operation 301, a first output signal conveying first visual information within a first field of view of a first optical element may be generated. The first field of view may be greater than 180 degrees. Visual information may include one or more of an image, a video, and/or other visual information. In some implementations, operation 301 may be performed by one or more image sensors the same as or similar to first image sensor 14 (shown in FIG. 1B and described herein).

At operation 302, a second output signal conveying second visual information within a second field of view of a second optical element may be generated. The second field of view may be greater than 180 degrees. The second optical element may be carried by a UAV such that a centerline of the second field of view is substantially opposite from a centerline of the first field of view. A peripheral portion of the first field of view and a peripheral portion of the second field of view may overlap. In some implementations, operation 302 may be performed by one or more image sensors the same as or similar to second image sensor 15 (shown in FIG. 1B and described herein).

At operation 303, a disparity of an object within the overlapping portions of the peripheral portion of the first field of view and the peripheral portion of the second field of view may be determined. In some implementations, operation 303 may be performed by one or more processors the same as or similar to processor 18.

At operation 304, flight control based on the disparity may be provided for the UAV. In some implementations, operation 304 may be performed by one or more processors the same as or similar to processor 18.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An unmanned aerial vehicle comprising:
    a housing;
    a motor carried by the housing, the motor configured to drive a rotor;
    a first image sensor carried within the housing and configured to generate a first output signal conveying first visual information based on light that becomes incident thereon;
    a second image sensor carried within the housing and configured to generate a second output signal conveying second visual information based on light that becomes incident thereon;
    a first optical element configured to guide light within a first field of view to the first image sensor, the first field of view being greater than 180 degrees, the first optical element being carried by the housing and being vertically oriented such that the first field of view is directed upwards when the unmanned aerial vehicle operates leveled with respect to ground;

a second optical element configured to guide light within a second field of view to the second image sensor, the second field of view being greater than 180 degrees, the second optical element being carried by the housing such that a centerline of the second field of view is substantially opposite from a centerline of the first field of view and a peripheral portion of the first field of view and a peripheral portion of the second field of view overlap, and being vertically oriented such that the second field of view is directed downwards when the unmanned aerial vehicle operates leveled with respect to ground, wherein the peripheral portion of the first field of view and the peripheral portion of the second field of view that overlap circumscribe the unmanned aerial vehicle and include 360 degrees of lateral directions around the unmanned aerial vehicle; and one or more processors carried by the housing, wherein the one or more processors are configured by machine readable instructions to:

receive the first output signal and the second output signal;

determine a disparity of an object within the peripheral portion of the first field of view and the peripheral portion of the second field of view that overlap; and provide flight control for the unmanned aerial vehicle based on the disparity.

2. The unmanned aerial vehicle of claim 1, wherein providing flight control for the unmanned aerial vehicle based on the disparity includes operating the unmanned aerial vehicle to maintain a minimum distance between the object and/or a maximum distance from the object.

3. The unmanned aerial vehicle of claim 1, wherein providing flight control for the unmanned aerial vehicle based on the disparity includes operating the unmanned aerial vehicle to maintain a set distance from the object.

4. The unmanned aerial vehicle of claim 1, wherein providing flight control for the unmanned aerial vehicle based on the disparity includes operating the unmanned aerial vehicle to maintain a minimum speed and/or a maximum speed.

5. The unmanned aerial vehicle of claim 1, wherein providing flight control for the unmanned aerial vehicle based on the disparity includes operating the unmanned aerial vehicle to maintain a set speed.

6. The unmanned aerial vehicle of claim 1, wherein the first optical element is carried by the housing such that the centerline of the first field of view is substantially parallel to the vertical axis of the unmanned aerial vehicle.

7. The unmanned aerial vehicle of claim 1, wherein the peripheral portion of the first field of view and the peripheral portion of the second field of view that overlap circumscribe the unmanned aerial vehicle around the vertical axis of the unmanned aerial vehicle.

8. The unmanned aerial vehicle of claim 1, wherein the first optical element includes one or more of a standard lens, a wide-angle lens, an ultra-wide-angle lens, and/or a fisheye lens.

9. The unmanned aerial vehicle of claim 1, wherein the second optical element includes one or more of a standard lens, a wide-angle lens, an ultra-wide-angle lens, and/or a fisheye lens.

10. A method for providing flight control for an unmanned aerial vehicle, the method comprising:

generating a first output signal conveying first visual information within a first field of view of a first optical element, the first field of view being greater than 180 degrees, wherein the first optical element is carried by an unmanned aerial vehicle and is vertical oriented such that the first field of view is directed upwards when the unmanned aerial vehicle operates leveled with respect to ground;

generating a second output signal conveying second visual information within a second field of view of a second optical element, the second field of view being greater than 180 degrees, wherein the second optical element is carried by the unmanned aerial vehicle such that a centerline of the second field of view is substantially opposite from a centerline of the first field of view and a peripheral portion of the first field of view and a peripheral portion of the second field of view overlap, and is vertically oriented such that the second field of view is directed downwards when the unmanned aerial vehicle operates leveled with respect to ground, wherein the peripheral portion of the first field of view and the peripheral portion of the second field of view that overlap circumscribe the unmanned aerial vehicle and include 360 degrees of lateral directions around the unmanned aerial vehicle;

determining a disparity of an object within the peripheral portion of the first field of view and the peripheral portion of the second field of view that overlap; and providing flight control for the unmanned aerial vehicle based on the disparity.

11. The method of claim 10, wherein providing flight control for the unmanned aerial vehicle based on the disparity includes operating the unmanned aerial vehicle to maintain a minimum distance between the object and/or a maximum distance from the object.

12. The method of claim 10, wherein providing flight control for the unmanned aerial vehicle based on the disparity includes operating the unmanned aerial vehicle to maintain a set distance from the object.

13. The method of claim 10, wherein providing flight control for the unmanned aerial vehicle based on the disparity includes operating the unmanned aerial vehicle to maintain a minimum speed and/or a maximum speed.

14. The method of claim 10, wherein providing flight control for the unmanned aerial vehicle based on the disparity includes operating the unmanned aerial vehicle to maintain a set speed.

15. The method of claim 10, wherein the first optical element is carried by the housing such that the centerline of the first field of view is substantially parallel to the vertical axis of the unmanned aerial vehicle.

16. The method of claim 10, wherein the peripheral portion of the first field of view and the peripheral portion of the second field of view that overlap circumscribe the unmanned aerial vehicle around the vertical axis of the unmanned aerial vehicle.

17. The method of claim 10, wherein the first optical element includes one or more of a standard lens, a wide-angle lens, an ultra-wide-angle lens, and/or a fisheye lens.

18. The method of claim 10, wherein the second optical element includes one or more of a standard lens, a wide-angle lens, an ultra-wide-angle lens, and/or a fisheye lens.

19. An unmanned aerial vehicle comprising:

a housing;

a motor carried by the housing, the motor configured to drive a rotor;

a first image sensor carried within the housing and configured to generate a first output signal conveying first visual information based on light that becomes incident thereon;

a second image sensor carried within the housing and configured to generate a second output signal conveying second visual information based on light that becomes incident thereon;

a first optical element configured to guide light within a first field of view to the first image sensor, the first field of view being greater than 180 degrees, the first optical element being carried by the housing such that a centerline of the first field of view is substantially parallel to the vertical axis of the unmanned aerial vehicle and being vertically oriented such that the first field of view is directed upwards when the unmanned aerial vehicle operates leveled with respect to ground;

a second optical element configured to guide light within a second field of view to the second image sensor, the second field of view being greater than 180 degrees, the second optical element being carried by the housing such that a centerline of the second field of view is substantially opposite from a centerline of the first field of view and a peripheral portion of the first field of view and a peripheral portion of the second field of view overlap, and being vertically oriented such that the second field of view is directed downwards when the unmanned aerial vehicle operates leveled with respect to ground, wherein the peripheral portion of the first field of view and the peripheral portion of the second field of view that overlap circumscribe the unmanned aerial vehicle around the vertical axis of the unmanned aerial vehicle and include 360 degrees of lateral directions around the unmanned aerial vehicle; and one or more processors carried by the housing, wherein the one or more processors are configured by machine readable instructions to:
  receive the first output signal and the second output signal;
  determine a disparity of an object within the peripheral portion of the first field of view and the peripheral portion of the second field of view that overlap; and
  provide flight control for the unmanned aerial vehicle based on the disparity.

20. The unmanned aerial vehicle of claim 19, wherein providing flight control for the unmanned aerial vehicle based on the disparity includes operating the unmanned aerial vehicle to maintain a minimum distance between the object and/or a maximum distance from the object.

* * * * *